United States Patent [19]

George et al.

[11] Patent Number: 5,463,288
[45] Date of Patent: Oct. 31, 1995

[54] BUS CONTROLLED ELECTRODE VOLTAGE FOR A CATHODE RAY TUBE

[75] Inventors: John B. George, Carmel; Lawrence E. Smith, Indianapolis, both of Ind.

[73] Assignee: Thomson Consumer Electronics, Inc., Indianapolis, Ind.

[21] Appl. No.: 115,609

[22] Filed: Sep. 3, 1993

[51] Int. Cl.$^6$ .............................. G09G 1/04; H01J 29/52
[52] U.S. Cl. .................... 315/382; 315/381; 315/383
[58] Field of Search ................................... 315/383, 367, 315/386, 381, 382, 411; 348/730, 687

[56] References Cited

U.S. PATENT DOCUMENTS

| | | | |
|---|---|---|---|
| 4,494,137 | 1/1985 | Freyberger et al. | 348/687 |
| 4,607,288 | 8/1986 | Freyberger | 315/382 |
| 4,722,005 | 1/1988 | Ledenbach | 348/687 |
| 4,724,364 | 2/1988 | Newton | 315/383 |
| 4,835,668 | 5/1989 | Palm et al. | 315/411 |
| 5,182,497 | 1/1993 | Yamate et al. | 315/383 |
| 5,216,336 | 6/1993 | Rodriguez-Cavazos | 315/387 |

OTHER PUBLICATIONS

Manual entitled VCU 2136 Video Codec, dated Mar. 1, 1990, published by ITT Semiconductors.
Yamamoto et al., "A New Video Processor for Color TV", 1988 and publ. by IEEE.

*Primary Examiner*—Gregory C. Issing
*Attorney, Agent, or Firm*—Joseph S. Tripoli; Joseph J. Laks; Sammy S. Henig

[57] ABSTRACT

A screen grid voltage or a focus voltage for a cathode ray tube is controlled via a digital-to-analog converter. The voltage variation range of the screen grid or focus voltage that can be obtained for the entire variation range of an output signal of the digital-to-analog converter is not significantly larger than that required for the type of cathode ray tube that is utilized.

3 Claims, 3 Drawing Sheets

BUS CONTROLLED ELECTRODE VOLTAGE FOR A CATHODE RAY TUBE

The invention relates to a video apparatus for controlling a voltage developed at an electrode of a cathode ray tube (CRT).

For the proper operation of a picture tube, for example in a television receiver or in a television or data display monitor, not only is it necessary to control the picture with the video signals, but also, among other things, to provide the picture tube with a high voltage, a focusing voltage for picture sharpness and a screen grid voltage for determining the operating point of the picture tube. These voltages are, as is know, generated in the high-voltage power supply circuit in connection with the horizontal sweep circuits, with the high-voltage power supply accordingly including the usual high-voltage transformer.

It is already known, after rectifying the high-voltage horizontal scan frequency retrace pulses to obtain the three above-named voltages on the secondary side of the high-voltage transformer by means of an ohmic voltage divider. The latter includes a potentiometer for the screen grid voltage, so that this voltage can be set at the desired value. Setting of the focus or screen grid voltage is typically performed manually by adjusting a potentiometer. The required level of the focus or screen grid voltage for obtaining high quality picture at the screen of the CRT may vary during the normal life of the CRT.

It may be desirable to utilize a microprocessor that is used, for example, to perform other control functions in a television receiver for adjusting the focus or screen grid voltage. Such arrangement simplifies the adjustment process in that the control of the high focus or screen grid voltage can be controlled via the microprocessor. The adjustment is done, unlike with the aforementioned potentiometer, remote from the high voltage and, therefore, such arrangement improves safety. Moreover, the use of the microprocessor obviates the need to obtain physical access to the high voltage supply circuitry that may reside in a portion of the receiver that is difficult to access.

A video display apparatus, embodying an aspect of the invention, for selectably controlling one of a screen grid voltage and a focus voltage of a cathode ray tube, includes a source of a digital control signal, and a digital-to-analog converter responsive to the digital control signal. An analog signal is generated at a level that is determined in accordance with bits of the digital control signal. An amplifier is coupled to a source of a high voltage and is responsive to the analog signal for generating the one voltage in accordance with the analog signal.

Figure 1:
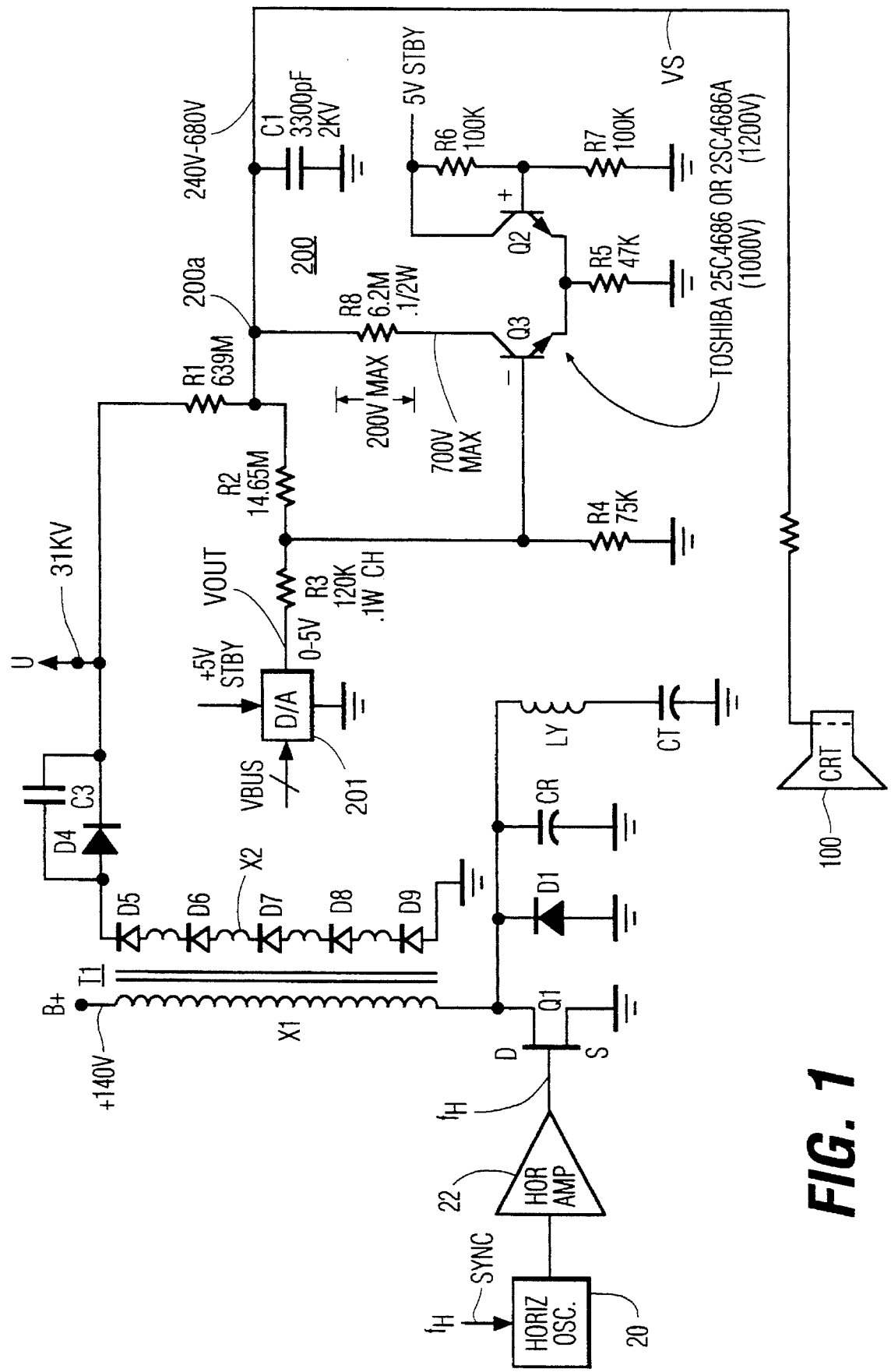
FIG. 1 illustrates a bus controlled arrangement for generating a screen grid voltage, embodying an aspect of the invention.

As shown in FIG. 1, a horizontal deflection circuit has a horizontal deflection winding LY for a CRT 100. A primary winding X1 of a horizontal output transformer T1 (also known as the flyback transformer) is coupled between a terminal where a DC supply voltage B+ is developed and a drain of a horizontal output transistor Q1. A horizontal oscillator 20 is coupled to the gate of horizontal output transistor Q1, through a driver stage 22. A retrace capacitor CR is coupled in parallel with horizontal output transistor Q1. A damper diode D1 clamps the minimum voltage at the collector of transistor Q1 to approximately ground potential.

Horizontal output transistor Q1 conducts current through winding X1 and through winding LY as the electron beam scans horizontally during the trace interval, and shuts off during retrace, thereby producing flyback pulses on capacitor CR, in winding X1 and on the drain of transistor Q1. An S-shaping or trace capacitor CT is coupled between the deflection winding and ground. In addition to the circuit components shown, the deflection circuits normally may include pincushion deflection circuits; however these have not been illustrated in order to simplify the drawings. Corresponding portions of a secondary winding X2 of transformer T1 are coupled in series with rectifying, distributed diodes in a conventional manner. An ultor voltage U is produced from secondary winding X2 of horizontal output transformer T1 via a diode D4.

A bus controlled digital-to-analog converter 201 generates an analog signal VOUT in the range of 0 V to 5 V for the entire range of values of a digital word signal VBUS. Signal VOUT is coupled to a screen grid voltage generating arrangement 200. Voltage U is coupled via a resistor R1 to arrangement 200.

Arrangement 200, embodying an aspect of the invention, generates a screen grid voltage VS. Arrangement 200 includes a pair of transistors Q2 and Q3 forming a differential amplifier. A base voltage of transistor Q2 is produced in a voltage divider, from the same supply voltage that energizes D/A 201, formed by a resistor R6 coupled in series with a resistor R7. The base voltage of transistor Q2 is established at approximately a mid-range point of signal VOUT, or 2.5 volts. A resistor R5 forms an emitter resistor to produce collector currents in transistors Q2 and Q3. A collector load resistor R8 is coupled between a collector of transistor Q3 and resistor R1. Screen grid voltage VS is developed at a junction terminal 200a, between resistors R1 and R8. Resistors R1 and R8 and a feedback resistor R2 determine the minimum value that screen grid voltage VS can assume. The minimum value occurs when signal VOUT is at 5 V or at the upper end of its voltage variation range.

Resistor R2 is coupled between terminal 200a and the base of transistor Q3. Resistor R2 determines the gain of amplifier 200. A resistor R4 is coupled between the base of transistor Q3 and ground. For a given value of resistor R2, resistor R4 is selected to produce screen voltage VS at the mid-range of voltage VS that is specified for a given CRT type such as, for example, 460 V for a range of 240 V–680 V, when signal VOUT is at its mid-range of 0 to 5 volts. When signal VOUT is at its mid-range, the current via resistor R3 is nominally zero. Consequently, voltage VS varies in the predetermined range of 240 V–680 V when signal VOUT varies within its entire voltage range of 0 to 5 V. The predetermined range of values that voltage VS assumes when signal VOUT varies within its entire voltage range is selected in accordance with the specification of the CRT.

In accordance with an aspect of the invention, the range of values that voltage VS assumes when signal VOUT varies within its entire voltage range is greater but not greater by more than 10% of the range required for the type of CRT used. The 10% excess range is selected so that the range required for the given type of CRT is obtained for the tolerance range of the components of amplifier 200.

Advantageously, substantially the entire range of signal VOUT is, thereby, adapted for producing the required voltage range of voltage VS. Since the entire range of signal VOUT is obtained from the entire range of bit combinations of signal VBUS, the resolution obtained from D/A 201 for adjusting voltage VS is optimally utilized.

Figure 2:
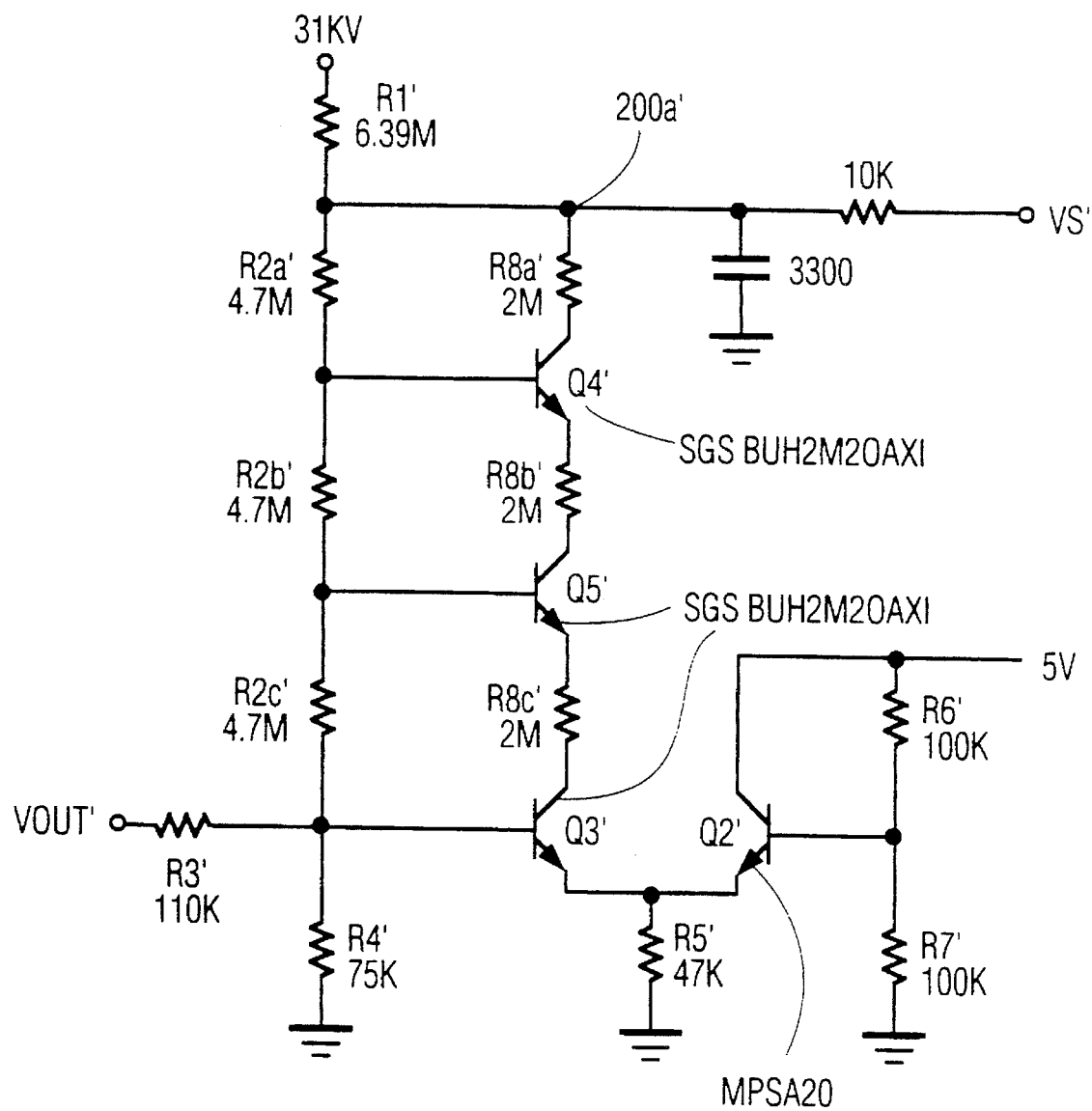
FIG. 2 illustrates a second embodiment of the invention in which a cascode arrangement is utilized.

FIG. 2 illustrates a schematic of an amplifier 200', embodying another aspect of the invention, that can be used in the arrangement of FIG. 1 instead of amplifier 200. Similar symbols and numerals in FIGS. 1 and 2 indicate similar items or functions except that the symbol (') designates a like item or function in FIG. 2.

In amplifier 200' of FIG. 2, a transistor Q5' and a transistor Q4' are coupled in series with transistor Q3' to form a cascode amplifier. A resistor R8c', coupled between transistors Q3' and Q5', a resistor R8b', coupled between transistor Q5' and Q4' and a resistor R8b', coupled between a terminal 200a' and transistor Q4 determine the minimum value that voltage VS' can assume in a similar manner to resistor R8 of FIG. 1. Similarly, a resistor R2a' of FIG. 2, a resistor R2b' and a resistor R2c' that are coupled in series determined the gain of amplifier 200' in a similar manner to resistor R2 of FIG. 1. Resistors R2a' and R2b' and R2c' of FIG. 2 provide the base voltages of transistors Q4' and Q5'. Advantageously, because of the cascode arrangement, amplifier 200' can be used for producing screen grid voltage VS' that is higher than voltage VS of FIG. 1.

Figure 3:
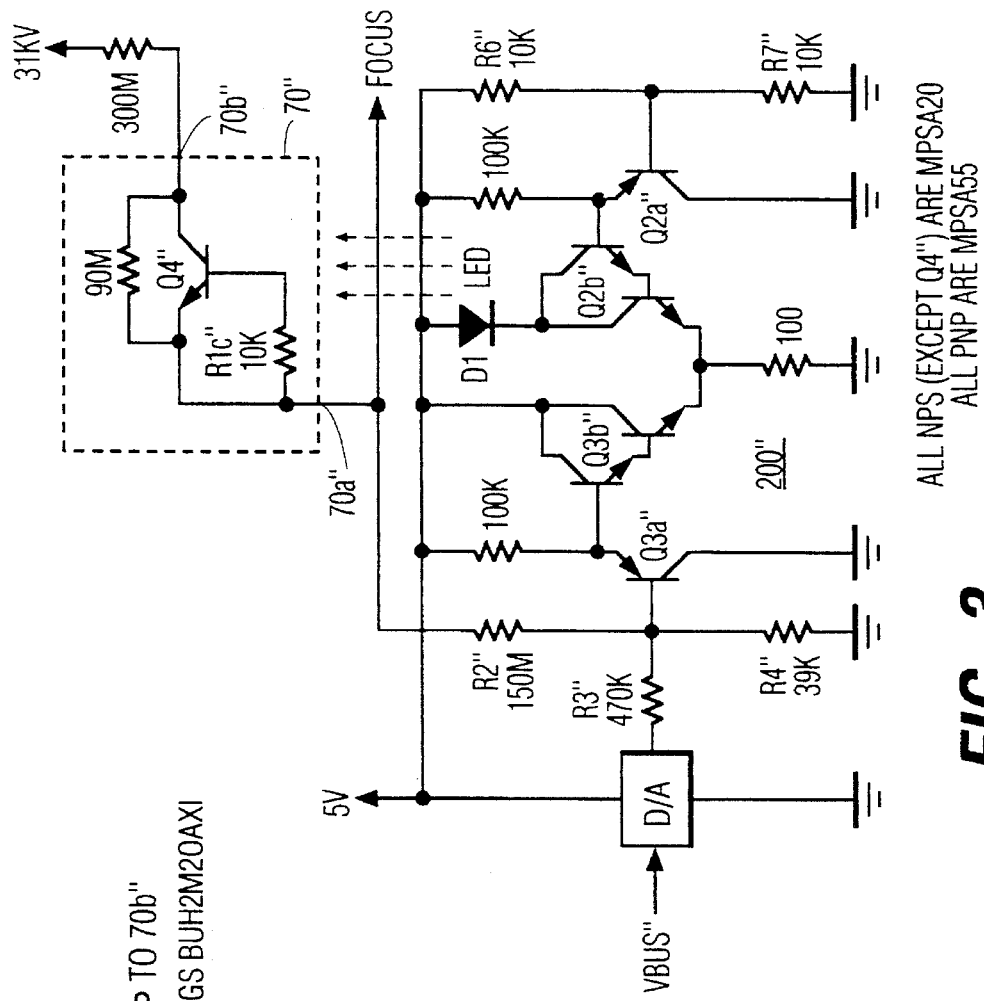
FIG. 3 illustrates a third embodiment of the invention in which a photo-coupler is utilized.

FIG. 3 illustrates a schematic of an amplifier 200", embodying a further aspect of the invention. In the example of FIG. 3, a DC focus voltage FOCUS is generated and controlled via the bus. Similar symbols and numerals in FIGS. 1–3 indicate similar items or functions except that the symbol (") designates a like item or function in FIG. 3.

In amplifier 200" of FIG. 3, a differential amplifier is formed by a Darlington configuration of transistors Q3a", Q3b", Q2b" and Q2a" for reducing bias current. A photo coupling arrangement includes a light emitting diode D1 and a light receiving arrangement 70". Diode D1 is coupled to the collector of transistor Q2b" with maximum current of, for example, 15 mA. Advantageously, because of the usage of the opto-coupler, an improved isolation between high and low voltages is obtained.

Figure 4:
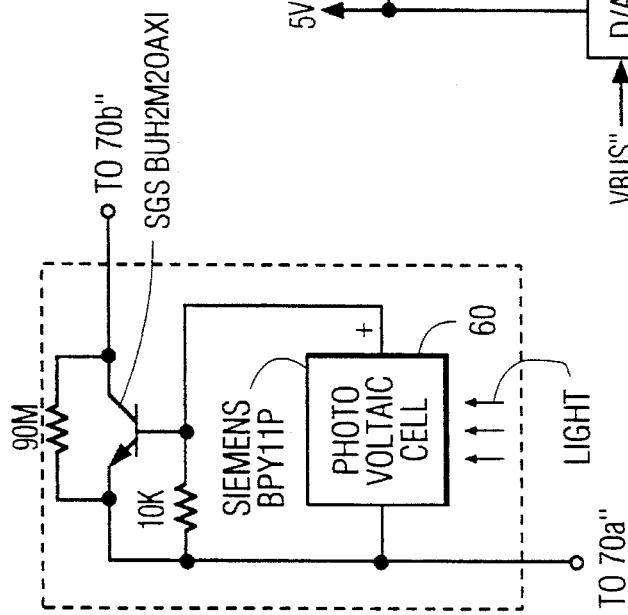
FIG. 4 illustrates a second alternative photo coupler for that used in the arrangement of FIG. 3 that includes a photo voltaic cell.
Figure 5:
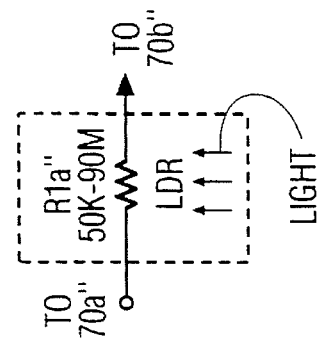
FIG. 5 illustrates a third alternative photo coupler for that used in the arrangement of FIG. 3 that includes a light dependent resistor.

Three alternatives of arrangement 70" are shown in FIGS. 3, 4 and 5, respectively. Similar symbols and numerals in FIGS. 3–5 denote similar items or functions. In the first configuration, a photo transistor Q4" of FIG. 3 is coupled in series with resistor R1b". A resistor R1c" coupled across the base-emitter junction of transistor Q4" prevents collector leakage current from self biasing transistor Q4". In the second configuration, shown in FIG. 4, a photo-voltaic cell 60 is coupled across the base-emitter junction Q4". In the second configuration, a transistor Q4a" is not a photo transistor but a conventional high voltage transistor. In the third configuration, a light dependent resistor (LDR) R1a" is coupled in series with a resistor R16". Resistor R1a" changes from 90MΩ to about 20 kΩ resulting in a change in focus voltage of about 1700 V.

What is claimed is:

1. A video display apparatus for selectively controlling a voltage in an electrode of an electron gun in a cathode ray tube, comprising:

means for generating a control signal that is indicative of a required magnitude of said electrode voltage;

a source of a first voltage; and an amplifier responsive to said control signal and coupled to said source of first voltage for generating said electrode voltage, said amplifier including a pair of transistors that are coupled in a cascode configuration for developing a first portion of a high voltage between a pair of main current conducting electrodes of one of said transistors and a second portion of said high voltage between a pair of main current conducting electrodes of the other one of said transistors, said amplifier including a feedback network that provides via a common feedback path a feedback signal to one of said transistors and a voltage that is coupled to the other one of said transistors for controlling at least one of said portions of said high voltage that are developed in each of said cascode coupled transistors.

2. An apparatus according to claim 1 wherein said feedback network comprises a resistor voltage divider having a first terminal that is coupled to said electron gun electrode, a second terminal that is coupled to a control terminal of said one transistor and an intermediate terminal that is coupled to a control terminal of the other one of said transistors.

3. An apparatus according to claim 1 wherein said high voltage is coupled to one of a screen grid and a focus electrode of said tube.

\* \* \* \* \*